United States Patent [19]

Shibata et al.

[11] Patent Number: 4,844,836
[45] Date of Patent: Jul. 4, 1989

[54] OPTICALLY ACTIVE CYANOBIPHENYL COMPOUND

[75] Inventors: Toshihiro Shibata; Norio Kurosawa, both of Saitama, Japan

[73] Assignee: Adeka Argus Chemical Co., Ltd., Tokyo, Japan

[21] Appl. No.: 276,362

[22] Filed: Nov. 23, 1988

[51] Int. Cl.$^4$ ...................... C09K 19/12; C07C 121/75
[52] U.S. Cl. ........................... 252/299.66; 252/299.01; 350/350 R; 558/423
[58] Field of Search ...................... 252/299.66, 299.01; 350/350 R; 558/423

[56] References Cited

U.S. PATENT DOCUMENTS

| | | | |
|---|---|---|---|
| 3,947,375 | 3/1976 | Gray et al. | 252/299.66 |
| 4,219,255 | 8/1980 | Raynes | 252/299.66 |
| 4,374,748 | 2/1983 | Inukai et al. | 252/299.66 |
| 4,431,564 | 2/1984 | Fukui et al. | 252/299.66 |
| 4,462,924 | 7/1984 | Raynes | 252/299.66 |
| 4,676,925 | 6/1987 | Inoue et al. | 252/299.66 |
| 4,723,005 | 2/1988 | Huynh-Bh et al. | 252/299.66 |
| 4,780,240 | 10/1988 | Emoto et al. | 252/299.01 |
| 4,786,730 | 11/1988 | Shibata et al. | 252/299.61 |
| 4,801,756 | 1/1989 | Kano et al. | 252/299.66 |
| 4,804,759 | 2/1989 | Shibata et al. | 252/299.01 |

*Primary Examiner*—Teddy S. Gron
*Attorney, Agent, or Firm*—Frishauf, Holtz, Goodman & Woodward

[57] ABSTRACT

The present invention discloses an optically active cyanobiphenyl compound represented by the following formula and nematic liquid crystal composition comprising thereof.

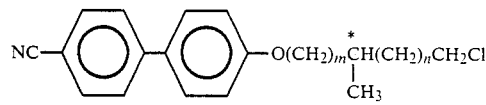

wherein, m is 2 or 3; n is 2 when m is 2 and n is one when m is 3; and * represents an asymmetric carbon atom.

6 Claims, No Drawings

OPTICALLY ACTIVE CYANOBIPHENYL COMPOUND

BACKGROUND OF THE INVENTION

1. Field of the Invention

This invention relates to an optically active cyanobiphenyl compound useful as a component of nematic liquid crystal composition.

2. Description of the Prior Art

The liquid crystal composition is used for display elements of twisted nematic (TN) type, super twisted nematic (STN) type and cholesteric-nematic phase transition type.

Optically active compounds such as (S)-4-cyano-4'-(2-methylbutoxy)biphenyl are added into the nematic liquid crystal composition used for above mentioned display device to induce the suitable helical pitch.

However, the effects of known optically active compounds are not sufficient yet and the induced helical pitch shows large temperature dependence.

SUMMARY OF THE INVENTION

It is the object of the present invention to provide an optically active cyanobiphenyl compound which can induce short helical pitch in nematic liquid crystal composition and give small temperature dependence of helical pitch.

The present invention provides a compound of following formula.

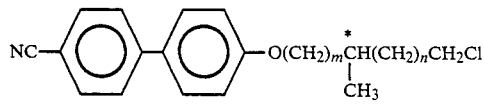

wherein, m is 2 or 3; n is 2 when m is 2 and n is one and when m is 3; and * represents an asymmetric carbon atom.

DETAILED DESCRIPTION OF THE INVENTION

The compound of the present invention as represented by the above formula can be prepared by conventional method.

For example, it may be prepared by reacting 4-hydroxy-4'-cyanobiphenyl with corresponding optically active alkyl tosylate.

To further illustrate the present invention, the following Examples will be given.

EXAMPLE 1

Synthesis of (R)-(4-cyano-4'-(6-chloro-3-methylhexyloxy)biphenyl

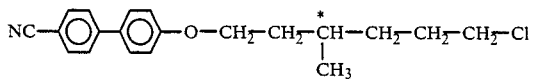

1.50 g of 4-hydroxy-4'-cyanobiphenyl, 0.40 g of sodium hydride (55%) and 13 ml of dimethylformamide were stirred for one hour at room temperature. The solution of 2.58 g of the tosylate of (R)-6-chloro-3-methylhexyl alkohol ([α]D = +0.63°, C = 1, chloroform solution) and 3 ml of dimethylformamide was added and stirred for 2 hours at 80° C.

The reaction solution was poured into 200 ml of ice-water and then extracted with diethylether.

The product was purified on a silica gel column with the use of hexane/ether (85/15) as a developing solvent. Thus 2.85 g of (R)-4-cyano-4'-(6-chloro-3-methylhexyloxy)biphenyl was obtained.

Infrared spectroscopy (cm$^{-1}$): 2930(s), 2880(m), 2220(s), 1600(vs), 1490(s), 1250(vs), 1180(s), 820(vs), 560(w) and 530(m).

Optical rotation: [α]D = +5.31° (C=1, CHCl$_3$ solution 27° C.).

The following phase transition was observed under a polarization microscope.

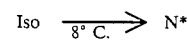

Iso: isotropic, N*: chiral nematic

EXAMPLE 2:

Synthesis of (R)-4-cyano-4'-(6-chloro-4-methylhexyloxy)biphenyl

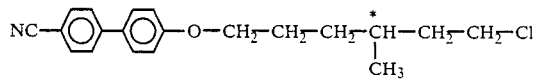

The procedure of Example 1 was followed except that the (R)-6-chloro-3-methylhexyl tosylate was replaced by (R)-6-chloro-4-methylhexyl tosylate prepared from optically active (R)-6-chloro-4-methylhexanol ([α]D = −3.67°, 27° C., C=1, chloroform solution) to thereby give the title compound.

Infrared spectroscopy (cm$^{-1}$): 2900 (m), 2860(m), 1600(s), 1490(s), 1240(vs), 1180(s), 820(vs), 560(w) and 530(m).

Optical rotation: [α]D = +3.79° (C=1, CHCl$_3$ solution, 27° C.).

Phase transition:

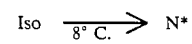

The above compounds and C-15 (BDH Ltd.; (S)-4-cyano-4'-(2-methylbutoxy)biphenyl) were blended with ZLI-1565 (Merck & Co., Inc.; nematic liquid crystal composition), and induced helical pitch of the blends was measured with Cano's wedge cell.

The results are shown below.

|  | Amount | Pitch (μm) 30° C. | 40° C. | 50° C. | 60° C. |
|---|---|---|---|---|---|
| Compound of Example 1 | 10 wt % | 2.1 | 2.2 | 2.2 | 2.4 |
| Compound of Example 2 | 10 wt % | 3.6 | 3.6 | 3.8 | 3.8 |
| C-15 (BDH Ltd.) | 10 wt % | 7.2 | 7.6 | 8.0 | 8.5 |

It is apparent from the results that the helical pitch induced by the compounds of this invention is short, and changes of helical pitch are small compared with C-15.

What is claimed is:

1. An optically active cyanobiphenyl compound represented by the following formula:

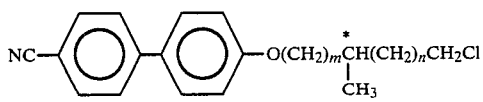

wherein, m is 2 or 3; n is 2 when m is 2 and n is one when m is 3; and * represents an asymmetric carbon atom.

2. (R)-4-cyano-4'-(6-chloro-3-methylhexyloxy)biphenyl.

3. (R)-4-cyano-4'-(6-chloro-4-methylhexyloxy)biphenyl.

4. A nematic liquid crystal composition comprising an optically active cyanobiphenyl compound represented by the following formula:

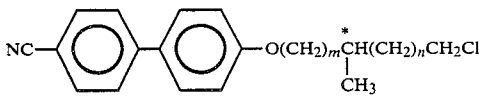

wherein, m is 2 or 3; n is 2 when m is 2 and n is one when m is 3; and * represents an asymmetric carbon atom.

5. A nematic liquid crystal composition comprising (R)-4-cyano-4'-(6-chloro-3-methylhexyloxy)biphenyl.

6. A nematic liquid crystal composition comprising (R)-4-cyano-4'-(6-chloro-4-methylhexyloxy)biphenyl.

* * * * *